(No Model.) 3 Sheets—Sheet 3.

F. P. PRINDLE & C. H. KOYL.
BICYCLE LANTERN.

No. 360,392. Patented Mar. 29, 1887.

Witnesses:
Chas. J. Williamson
Henry C. Hazard

Inventors
F. P. Prindle & C. H. Koyl, by
Prindle & Russell, their Attys

UNITED STATES PATENT OFFICE.

FRANK P. PRINDLE AND C. HERSCHEL KOYL, OF WASHINGTON, D. C.

BICYCLE-LANTERN.

SPECIFICATION forming part of Letters Patent No. 360,392, dated March 29, 1887.

Application filed December 17, 1886. Serial No. 221,887. (No model.)

*To all whom it may concern:*

Be it known that we, FRANK P. PRINDLE and C. HERSCHEL KOYL, of Washington, in the District of Columbia, have invented certain new and useful Improvements in Bicycle-Lanterns; and we do hereby declare that the following is a full, clear, and exact description thereof, reference being had to the accompanying drawings, making a part of this specification, in which—

Figure 1:
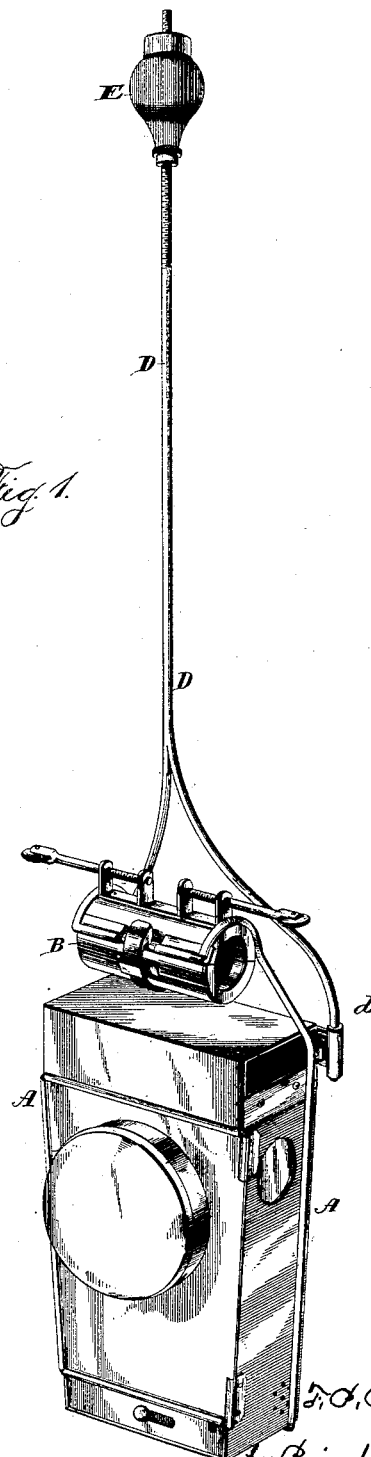
Figure 2:
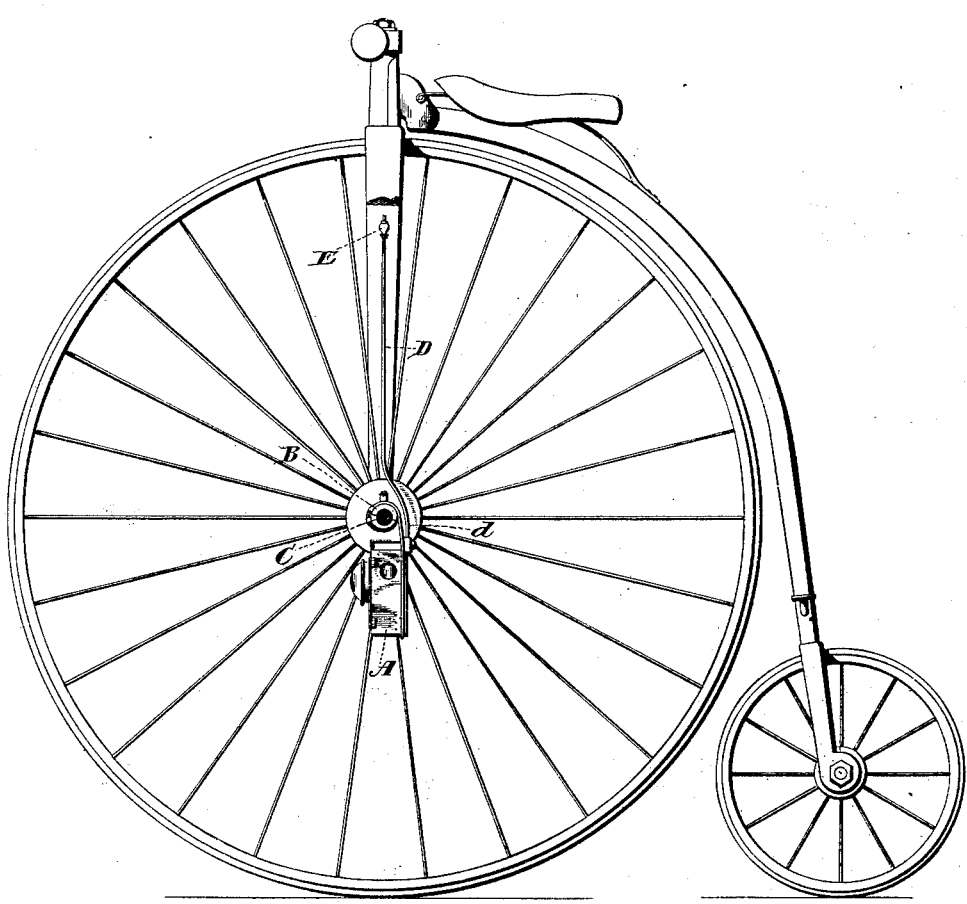
Figure 3:
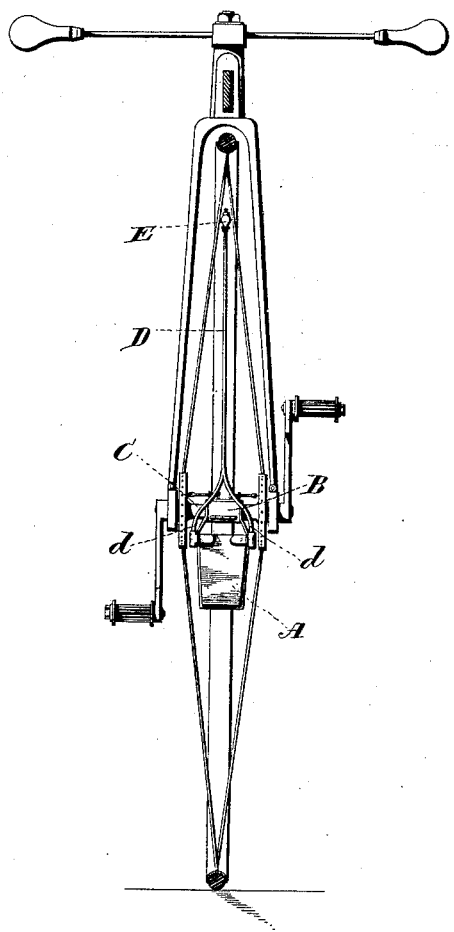

Figure 1 is a perspective view of our lantern detached from a bicycle. Fig. 2 is a side elevation of the same in position upon a bicycle, a portion of the standard and of the wheel being removed. Fig. 3 is a rear elevation of said lantern and bicycle, the wheel of the latter being partly in section.

Letters of like name and kind refer to like parts in each of the figures.

In the use of bicycles at night much difficulty has heretofore been experienced in securing sufficient light upon the road to enable the rider to see and avoid obstructions, which difficulty has arisen from the swinging of the lantern as the wheels pass over inequalities in the roadway, and the speed of the vehicle is thereby varied.

The design of our invention is to prevent the swinging of a bicycle-lantern, and thereby to cause light therefrom to be thrown steadily forward at a predetermined angle; and to this end our said invention consists in the means employed for steadying a bicycle-lantern when the bicycle is in motion, substantially as and for the purpose hereinafter specified.

Our invention is applicable to any of the usual forms of bicycle-lanterns, one of which is shown in the drawings, and exteriorly consists of a body, A, that is rectangular in horizontal section and substantially rectangular in side elevation, and at its upper end is provided with a separable bearing, B, which bearing is adapted to be placed upon and closed around the central portion of the axle C of a bicycle, so as to suspend the lantern from said axle.

Secured to the rear upper corners of the lantern A are the ends $d$ and $d$ of a bifurcated rod, D, which rod extends upward, as shown, and at or near its upper end is adapted to receive a weight, E. Said weight is preferably made adjustable lengthwise of said rod, but may be permanently secured in place thereon, if desired. The rod D is preferably made detachable from the lantern A, in order that it may be readily transported and safely stored when said lantern is removed from the bicycle; but, if desired, the ends of said rod may be pivoted or hinged to said lantern, so as to enable it to be folded back upon the latter when not in use.

The office of the weighted rod is to counterbalance the lantern, so as to prevent the latter from swinging forward whenever the momentum of the bicycle is checked, the tendency of said counter-balance under such circumstances being to move in the same direction as said lamp.

It will be obvious that the weight of the counter-balance must be less than that of the lamp, in order that the latter may maintain its position below the axle; and it has been demonstrated that the best results can be obtained by the use of a long very light rod supporting a comparatively small weight, as by placing the weight at as great a distance as is practicable from the point of suspension the moment of inertia of a light weight may be caused to equal the moment of inertia of the greater weight of the lantern, which is placed nearer the point of suspension.

Having thus fully described our invention, what we claim as new is—

1. As an improvement in bicycle-lanterns, in combination with a lantern which has a suitable suspensory bearing, a weighted arm secured to the lantern and extending above its said bearing, substantially as and for the purpose specified.

2. As an improvement in bicycle-lanterns, in combination with a lantern which is provided with a suitable suspensory bearing, an arm that is secured to and extends from the lantern above such bearing, and a weight upon said arm which is adapted to be adjusted along the same, substantially as and for the purpose shown.

3. As an improvement in bicycle-lanterns, in combination with a lantern which is provided with means for suspending it, a counter-balancing-weight which is connected with the lantern at a point above the point of suspension, substantially as and for the purpose set forth.

4. In combination with a bicycle-lantern provided with suspensory devices, a counterbalancing-weight connected with the lantern, situated above the point of suspension and made adjustable toward or from such point, substantially as and for the purpose shown and described.

5. As an improvement in bicycle-lanterns, in combination with a lantern, a counterbalancing weighted arm adapted to be connected with or disconnected from the lantern, and which, when connected with the lantern, is located mainly above the suspensory bearing of the lantern, substantially as and for the purpose specified.

In testimony that we claim the foregoing we have hereunto set our hands this 2d day of December, 1886.

FRANK P. PRINDLE.
C. HERSCHEL KOYL.

Witnesses:
GEO. S. PRINDLE,
HENRY C. HAZARD.